CUTTER COMPENSATION SYSTEM FOR AUTOMATIC MACHINE TOOL

Filed Dec. 29, 1961

INVENTOR.
JOHN L. McKELVIE

BY Allen M Kross

ATTORNEY

April 12, 1966 J. L. McKELVIE 3,246,129

CUTTER COMPENSATION SYSTEM FOR AUTOMATIC MACHINE TOOL

Filed Dec. 29, 1961 4 Sheets-Sheet 2

INVENTOR.
JOHN L. McKELVIE
BY Allen M Krass
ATTORNEY

April 12, 1966 J. L. McKELVIE 3,246,129

CUTTER COMPENSATION SYSTEM FOR AUTOMATIC MACHINE TOOL

Filed Dec. 29, 1961

INVENTOR.
JOHN L. McKELVIE
BY Allen M Krass
ATTORNEY

April 12, 1966 J. L. McKELVIE 3,246,129

CUTTER COMPENSATION SYSTEM FOR AUTOMATIC MACHINE TOOL

Filed Dec. 29, 1961

INVENTOR.
JOHN L. McKELVIE
BY Allen M Krass
ATTORNEY

United States Patent Office 3,246,129

Patented Apr. 12, 1966

1

3,246,129

CUTTER COMPENSATION SYSTEM FOR AUTOMATIC MACHINE TOOL

John Lachlan McKelvie, Royal Oak, Mich., assignor to The Bendix Corporation, Southfield, Mich., a corporation of Delaware Filed Dec. 29, 1961, Ser. No. 163,146
4 Claims. (Cl. 235—151)

This invention relates to machine tools and the like which are automatically controlled from a numerical record and more particularly to a system for accommodating the operation of such machines to the use of cutters of various sizes.

Electronic systems for controlling milling machines in accordance with a numerical record, which often takes the form of a punched tape, have found extensive application in the manufacture of the small quantities of identical parts. The numerical record prescribes a continuous path which is to be followed by the cutter of the milling machine in order to form a particular part. While in a manually controlled machine a particular part might be formed by milling cutters within a range of diameters, the paths to be followed by tools of different diameter are similar but not identical, so that a given record may only be utilized with one diameter cutter. The limitation applies to the use of worn or oversize cutting tools as well as to the use of those of basically different diameter.

It is therefore an object of the present invention to provide an automatic control system for a milling machine which includes means for varying the response of the machine to a particular numerical record in order to allow the machine to be used with cutters having a different diameter than those contemplated by the record. Assuming that the record will cause the machine to move along a path which will produce a correct path when traversed by a cutter of a diameter $D_1$, and it is desired to utilize a cutter having a diameter $D_2$, it is necessary to displace the cutter from the programmed path by a distance $E=D_1-D_2/2$. This displacement must be along a line normal to the cutter path at each given instant. Since this normal may vary from point to point along the path, it is necessary to continuously or repeatedly calculate the angle of the normal with respect to the axes and to add incremental motions to each axis which will vectorially add up to the correction E.

In the class of machines which develop analog signals proportional to points along the cutter path and control the motion of the cutter in accordance with these signals, it is simply necessary to provide a system for calculating the angle of the normal with respect to the machine axes and then to generate voltages which are equal to the sine and cosine of the angle multiplied by the correction factor. These voltages may then be directly added to the record produced control signals to provide corrected signals.

Another class of controlled milling machines utilizes digital signals related to the desired cutter path to control the machine. It is a further object of the present invention to provide a cutter compensation system which is compatible with a machine that is essentially digital in operation.

The present invention achieves the above objects through a system which determines the normal to the cutter path through use of digital data contained on a record. It further uses analog techniques to develop both the sine and the cosine of the angle of the normal with respect to the cutting axes and to multiply these trigometric relations by a correction factor which may be set into the machine by the operator before each machine run. This correction factor is a function of the difference between the programmed cutter and the actual cutter diameter used in the machine.

2

The analog technique preferably used with the present invention consists of generating and adding two signals having properties related to the rate motion of the cutter along the two axes. The sum signal then has a property relating to the resultant cutting angle. This property is utilized to generate two signals having properties related to one another as are the sine and cosine of the resultant angle.

A preferred embodiment of the present invention, which will subsequently be described in detail, is illustrated in connection with a digital control system for a milling machine of the type described in United States Patent No. 3,128,374, filed December 8, 1960. Such a system is capable of moving a cutter along either a straight-line path or a circular path between programmed points contained on the tape. The cutter compensation system is designed to be operative with either of these modes. In either mode, information is contained in the control system which is a function of the rate of motion of the cutter along two coordinate axes. The present circuitry receives these signals in digital form and uses a well-known technique to develop analog voltages representative of the two components. These analog signals are used to amplitude modulate two square waves 90 degrees out of phase. These are filtered and added to produce a resultant sine wave phase shifted from the reference square wave by an angle whose tangent is the ratio of the analog voltages representing the two components. This resultant sine wave is then shaped into a keying square wave. Two reference sine waves in phase with the original square waves are passed through demodulators which have the keying square wave as their inputs. Their outputs are voltages proportional to the sine and cosine of the phase angle of the resultant sine wave, and thus proportional to the axis components of the cutter feed rate vector. These voltages are imposed across potentiometers on which the machine operator sets the cutter correction so as to multiply this factor by the sine and the cosine of the normal angle. The system then adds these two voltages directly to the servo system which powers the machine tool axes so that they are summed with the control signals developed at these points by the digtal system.

It is therefore seen to be another object of the present invention to provide a cutter compensation system which will accept data relating to the normal angle in digital form and then convert it to analog form so that relatively simple analog techniques may be used to generate voltages proportional to the sine and cosine of the normal angle which may then be multiplied by the normal correction factor to obtain compensating voltages for the servomechanisms.

It should be understood that the system might also be applied to a type of control in which data is directly available in analog form, as well as systems wherein the correction factor is only available in digital form.

Other objects, advantages and applications of the present invention will be made apparent by the following detailed description of a preferred embodiment of the invention. The description makes reference to the accompanying drawings in which.

While the invention is illustrated in connection with a digital control system of the type specifically described in U.S. Patent No. 3,128,374, filed December 8, 1960, it is equally applicable to other numerical control systems of that general class, such as that described in U.S. Patent No. 3,002,115. Accordingly, the non-inventive, but co-operative, elements of the system will be described in a functional manner. Reference may be had to other sources, such as those noted above, for specific details of systems, operation, or construction.

Figure 1:
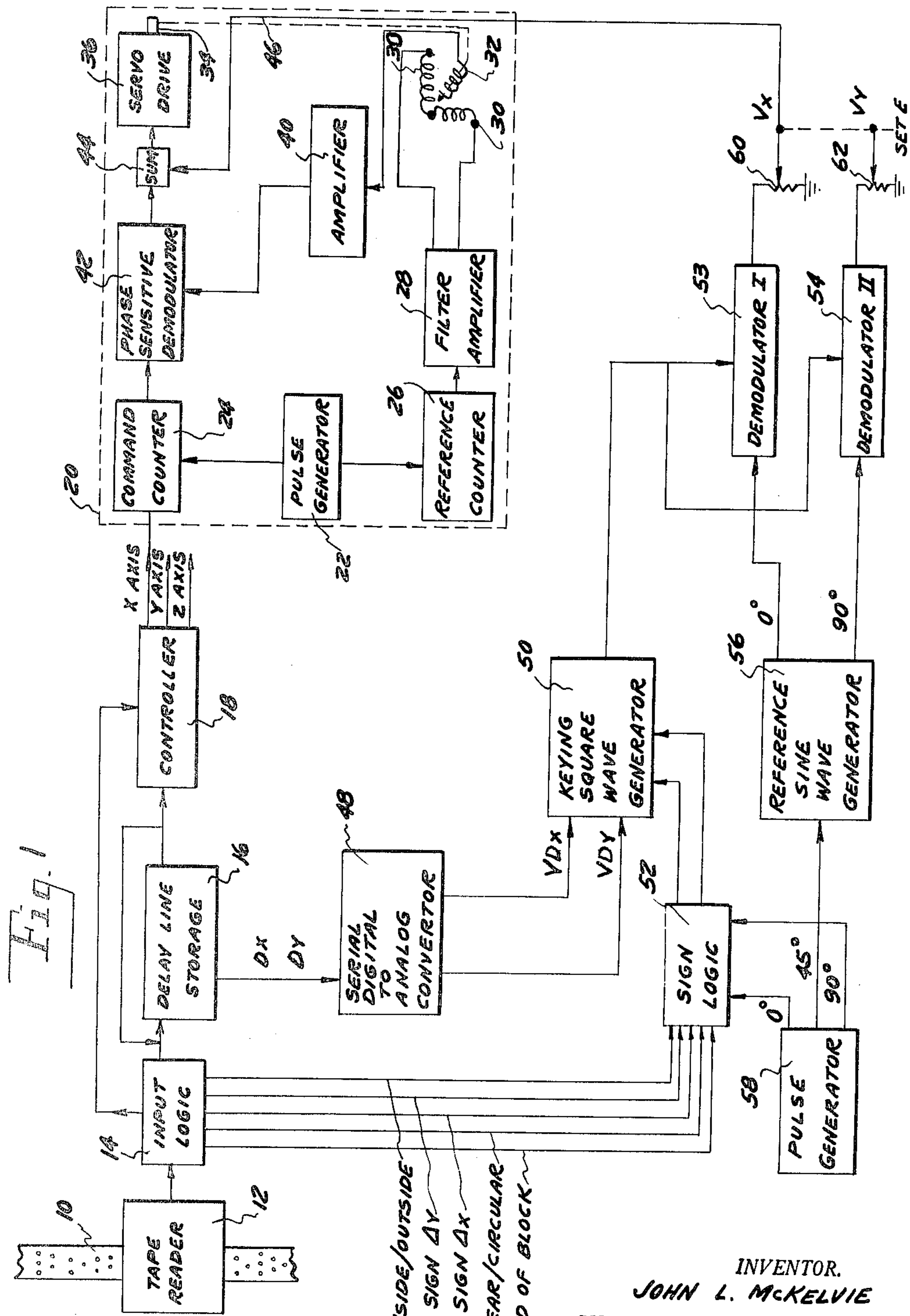
FIG. 1 is a block diagram of the entire control system, of which the invention constitutes a sub-system.

Referring to FIGURE 1 the information for the control of this system is normally contained on a punched tape 10. A tape reader 12 converts the information into electrical form and feeds it to an input logic section 14.

The information on the tape may be conveniently divided into groups, termed "blocks," each of which contains the data necessary for the machine to complete one linear or circular motion increment. For a linear cut, the block information contains code signals relating to the total length of the X motion, Y motion and Z motion, and their signs; the fact that the block is linear; and, an end of block signal. For use with the present invention, the tape must contain a code indicating whether the machined surface is to the left or right of the advancing cutter For a circular cut, the length and signs of the X, Y and Z motions are replaced by codes for the coordinates of the beginning and end points of a circle to be cut in two coordinates.

The input logic unit 14 receives this information and presents it to a delay line storage unit 16, and a controller 18 upon the occurrence of predetermined conditions. The delay line storage unit 16 and the controller 18 operate to convert the tape information into three trains of pulses, which are then transmitted to the X axis servo-system 20 and similar systems for the Y axis and the Z axis, which are not shown. The servo-system 20 operates in a manner more particularly described in U.S. Patent No. 3,011,110, filed May 27, 1957, to convert the train of pulses which it receives from the controller into an output motion. The total length of the output motion is directly proportional to the number of pulses in the train, and the rate of output motion is proportional to the rate of pulse reception from the controller 18.

The servo drive includes a pulse generator 22 which provides uniform trains of pulses to a command counter 24, which also has as an input the pulse train from the controller 18, and to a reference counter 26. The reference counter provides an output square wave which shifts sign upon the receipt of a particular number of pulses from the generator 22. This square wave is transmitted to a filter and amplifier 28, which converts the square wave into a pair of sine waves 90 degrees apart in time phase. The two sine waves are fed to the two stator coils 30 of a resolver. The rotor coil 32 of the resolver is mechanically coupled to the output shaft 34 of a hydraulic servo drive unit 36. This drive unit provides an output motion which is a function of its electrical input.

The rotor coil 32 of the resolver provides output to an amplifier 40, which in turn feeds a phase sensitive demodulator 42. The demodulator 42 has as its keying input a square wave from the command counter 24. This command counter converts the pulses from the generator 22 into a square wave in the same manner as the reference counter 26, but adds or subtracts the signals from the controller 18 from the pulse generator train, depending upon the sign of the X motion, as contained on the tape. Thus, the square wave to the demodulator 42 from the command counter 24 is advanced or retarded in its phase with respect to the square wave from the counter 26, as a function of the pulses received from the controller 18.

The demodulator 42 provides an output D.C. signal which is a function of the phase difference between the command counter keying square wave and the signal on the rotor coil 38 of the resolver. In a conventional control system, this output is fed directly to the servo drive

36, to cause it to rotate the rotor coil 32 in such an manner as to bring the phase of the signal on the rotor coil 32 into agreement with the command signal from the counter 24. In this manner, the output shaft is rotated in accordance with the X command signal from the controller 18.

In the present invention, the D.C. signal from the demodulator 42 is first fed to a summing network 44, which also receives a signal on line 46 from the cutter compensating circuitry, which will be hereinafter described. The line 46 carries a D.C. signal of such magnitude and sign as to correct the signal from the demodulator 42 for the variation of the milling cutter being translated by the shaft 34 from the ideal diameter milling cutter for which the tape 10 was prepared. A similar signal is provided to the Y axis servo-system (not shown). Since the correction is a two-dimensional one, the Z axis system does not have to be compensated.

The non-linearity of the resolver feed back used in the preferred embodiment limits the magnitude of the correction signal which may be utilized with accuracy to the equivalent of approximately 1/20 of a resolver revolution. By adding a compensating non-linear circuit between each potentiometer (60, 62) and its corresponding summing network, the accurate range may be extended toward the theoretical limit of 1/4 resolver revolution. If corrections of still larger magnitude are desired, the numerical control system must employ a linear feed back device, such as a potentiometer, in place of the resolver.

With the exception of the summing unit 44 and the line 46, the system which has heretofore been described is known in the prior art, and its elements are only novel as they appear in combination with the entire inventive concept. The novel aspects of the control circuit will be described hereinafter.

The delay line storage unit 16 feeds a serial digital signal, termed $D_x$ and $D_y$, to a serial digital to analog converter 48 (FIG. 1). The $D_x$ and $D_y$ signals represent the length of the X and Y paths when a block of linear interpolation is being operated on and represents the continuously varying coordinates of the radius vector for a block of circle interpolation. Since the slope of the cutting path during circular motion is the negative reciprocal of the slope of the radius vector, the $D_x$ signal, for circular interpolation, is proportional to the instantaneous Y coordinate cutting speed, and vice versa. The subsequent circuitry calculates the resultant motion angle in the X and Y plane from these quantities and generates the sine and the cosine of the slope angle, which will be multiplied by a cutter correction factor for addition to the particular servo drives.

The serial digital to analog converter operates to establish analog representations of the two motion components. These representations are static in the sense that both occur simultaneously, although in care of circular interpolation they vary from instant to instant and during both circular and linear interpolation they change as a new block is operated upon by the control system. The two static representations which will be termed $VD_x$ and $VD_y$ are provided to a keying square wave generator 50. This unit also has two inputs from a sign logic unit 52, which constitute two square waves 90 degrees out of phase with respect to one another. The keying square wave generator 50 utilizes these signals to provide a square wave output which is shifted with respect to its input square waves by the resultant cutting angle. The operation of the square wave generator 50 will be described in more detail subsequently.

The generator 50 provides output to two additional phase sensitive demodulators 53 and 54. The demodulator 53 has input from one output of a reference sine wave generator 56 which provides a sine wave having a phase displacement of zero degrees with respect to one of the two square waves which were provided to the keying square wave generator 50. The other demodulator 54 has as its input a sine wave which is shifted by 90 degrees with respect to the sine wave applied to demodulator 53.

Both the sign logic unit 52 and the reference sine wave generator 56 receive their signals from a pulse generator 58. The generator 58 provides two outputs to the sign logic unit which are displaced by 90 degrees and a third output to the sine wave generator 56 which is displaced by 45 degrees with respect to the other two square waves. The sine wave generator 56 converts its input square wave to a sine wave and then develops two sine waves displaced 45 degrees in each direction from the first for transmission to the demodulators 53 and 54.

The demodulators 53 and 54 each provide, as their output, a D.C. signal proportional to the cosine of the phase angle between their input from the sine wave generator and from the keying square wave generator 50. In case of the demodulator 53 this signal is proportional to the sine of the resultant cutting angle, while the demodulator 54 provides an output signal proportional to the cosine of the cutting angle. These signals are imposed upon potentiometers 60 and 62, both of which are manually set by the operator to a correction factor E. The output from the movable contact of potentiometer 60 is transmitted along line 46 to the summing unit 44, as previously noted. The output from the movable contact of potentiometer 62 is transmitted to a similar point in the Y servo drive.

In broad summary, the manner of operation of the compensation signal generating sub-system is as follows: The serial digital to analog converter 48 receives signals representative of the X and Y components of motion from the delay line storage unit 16 and presents them in static analog form to a keying square wave generator 50, which also has as inputs two square waves, 90 degrees out of phase with one another, from the pulse generator 58. The sign logic unit 52 has a plurality of inputs from the input logic circuit 14 and uses them to determine the manner of transmission of the two signals to the keying square wave generator in a manner which will be subsequently described. The keying square wave generator provides an output square wave which is shifted with respect to its input square waves by the resultant cutting angle. This signal keys two phase sensitive demodulators 53 and 54, which have as their inputs reference sine waves displaced from one another by 90 degrees. The outputs of the demodulators are therefore proportional to the sine and cosine of the resultant cutting angle. Potentiometers 60 and 62 multiply these signals by the correction factor E to provide compensating signals for the two servo drives.

Figure 3:
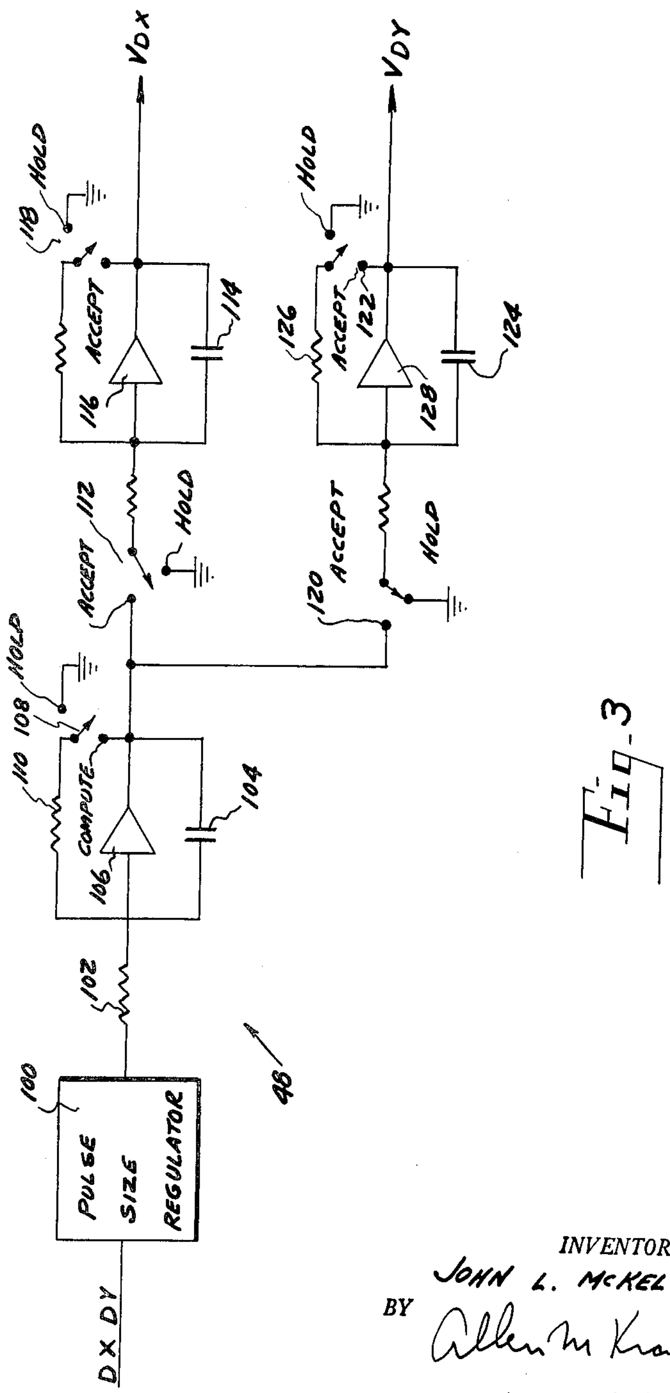
FIG. 3 is a diagram, partly in block form, partly in schematic form, illustrating some of the circuitry employed in the preferred embodiment.

The serial digital to analog converter 48 is disclosed in more detail in FIG. 3. The signals $D_x$ and $D_y$ which occur in serial binary form are first passed through a pulse size regulator 100, which reshapes them. Assuming that $D_x$ is being transmitted to the pulse size regulator first in serial binary form with its least significant bit leading, it is passed through a resistance 102 and acts to charge a condenser 104. The condenser 104 is shunted by an operational amplifier 106, which assures that the input point to the capacitor 104 remains at virtual ground potential to prevent the charge on 104 from blocking additional charge input. When a transistor switch 108 is in the "Compute" position, as it is when $D_x$ is being received, a resistor 110 also shunts the capacitor 104. The time constant of this RC circuit is such that 50% of the charge on the capacitor decays during the time that each bit in the word $D_x$ occupies. Therefore, after the receipt of $n$ bits $n, n-1, n-2 \ldots 3, 2, 1$, each of a voltage X, the charge on capacitor 104 will be $X_1+X_2/2+X_3/4+ \ldots X_n/2^{n-1}$. This is equal to the analog value of $D_x$.

After all the digits in $D_x$ have been received the switch 108 is pulsed to return it to the "Hold" position, wherein the charge in the capacitor 104 is retained. Simultaneously another transistor switch 112 is pulsed to the "Accept" position. This allows a capacitor 114 to become charged to a value which is retained by an operational amplifier 116. A transistor switch 118 operates in connection with the switch 112 and returns to the "Hold" position, as does the switch 112, after a sufficient time has elapsed to fully charge the capacitor 114 to the voltage of the capacitor 104. The voltage across the capacitor 114 comprises the $VD_x$ which provides one input to the keying square wave generator 50.

A similar circuit consisting of switches 120 and 122, a capacitor 124, a resistor 126, and an operational amplifier 128, operates to receive the $D_y$ voltage which is computed on the capacitor 104 following the transmission of $VD_x$ to the capacitor 114. If the words $D_x$ and $D_y$ follow each other immediately the capacitor 104 will miss the first few bits of the second word while it is transferring the analog value of the first word to its "Hold" circuit. However, if the word has a sufficient number of bits this loss will not be of significance because of the fact that the least significant bits are transferred first.

Figure 2:
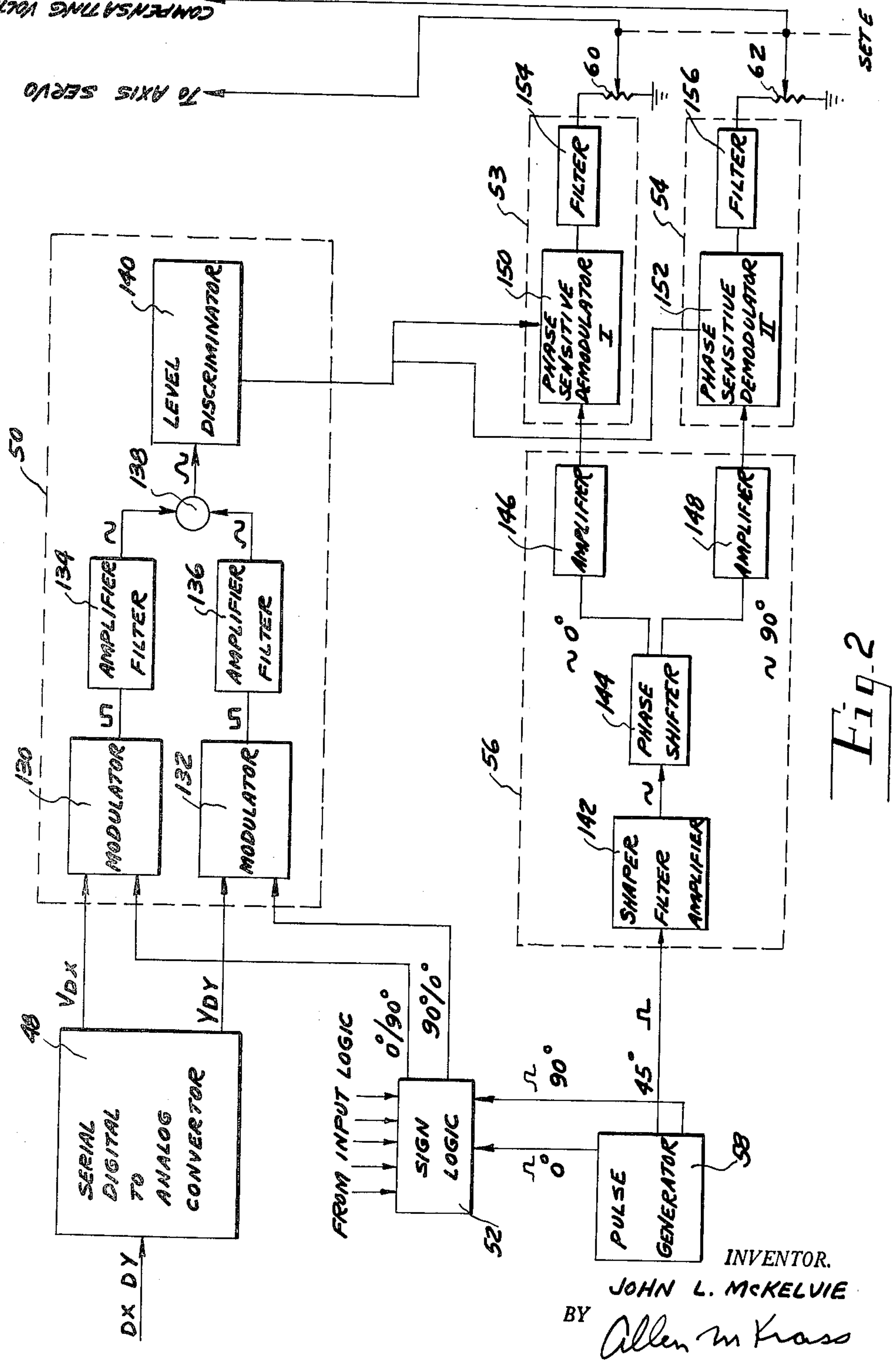
FIG. 2 is a block diagram of the sub-system of the present invention.

As seen in FIG. 2 the keying square wave generator 50 includes a pair of modulators 130 which receives $VD_x$, and 132 which receives $VD_y$. Each of these modulators also receives a square wave from the sign logic unit 52. The square waves are displaced from one another by 90 degrees. Their preparation and transmission to the modulators 130 and 132 will be subsequently described. $VD_x$ and $VD_y$ are used to amplitude modulate the square waves, which are then passed through amplifiers and filters 134 and 136 to form sine waves displaced by 90 degrees from one another and having magnitudes proportional to $VD_x$ and $VD_y$. These sine waves are summed by unit 138 to form a single sine wave which has a phase shift with respect to the square waves from the sign logic unit which is equal to the cutting angle which $D_x$ and $D_y$ will produce. This sine wave is provided to a level discriminator 140, which utilizes the zero cross-over point of the sine wave to generate a square wave having an identical phase shift.

As has been noted the pulse generator 58 provides the two square waves displaced by 90 degrees from one another which the sign logic unit transmits to modulators 130 and 132. The sign logic unit 52 acts as a reversing switch and determines which of the two square waves goes to which of the two modulators 130 and 132 on the basis of information received from the input logic unit 14. It may readily be seen that the reversal of the square waves to the two modulator units 130 and 132 will result in a 180-degree shift of the compensation signals with respect to the normal cutter path. The linear/circular information is required because the $D_x$ and $D_y$ signals in circular interpolation are proportional to the Y and X cutting components respectively while the other factors are inherent in determining the sign of the compensation signal.

Figure 4:
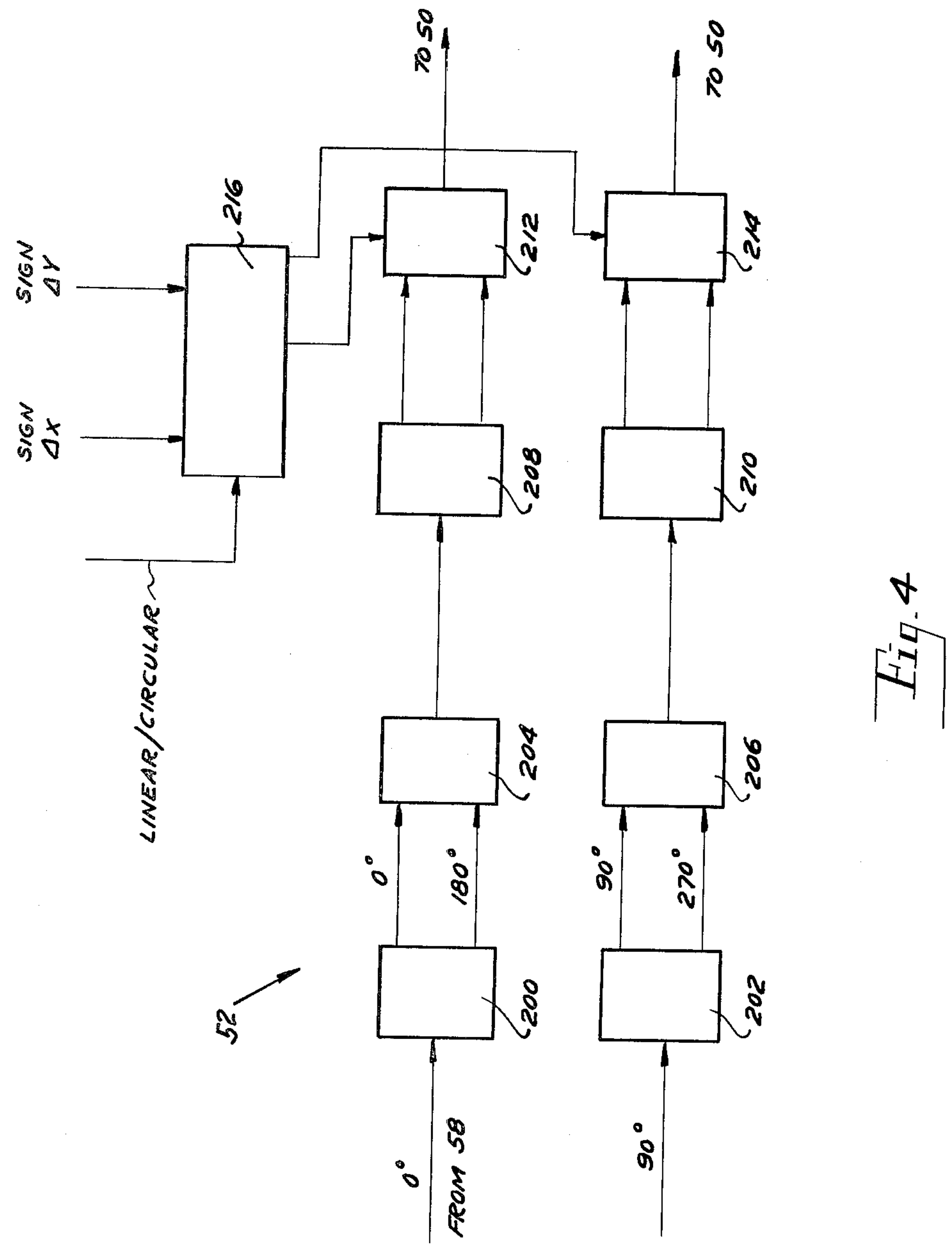
FIG. 4 is a block diagram disclosing the operation of the sign logic circuit.

The internal construction of the sign logic unit 52 is of course a function of the versatility required in the contouring system. If a system were designed so as to perform a limited class of cuts such as linear cuts in a single direction, the sign logic unit would not be required at all. The unit employed with the preferred embodiment may be constructed in accordance with switching techniques such as those disclosed in the volume Pulse and Digital Circuits by Jacob Millman and Herbert Taub, McGraw-Hill Book Company, Inc., 1956, and chapter 13 in particular. As shown in FIGURE 4, the two signals from the pulse generator 58 are fed to a pair of flip-flops 200 and 202 which provide outputs constituting their input signals and the complements of such input signals. These sets of signals provide the inputs to selector switches 204 and 206 which have the "inside/outside" signals as inputs. The switches 204 and 206 gate out one of their two inputs depending upon the nature of the "inside/outside" signal. When the "inside/outside" signal reverses in polarity, the switches 204 and 206 reverse their output signals. These signals are fed to flip-flops 208 and 210 which again provide the input signals and their inversions as outputs. These outputs are fed to selector switches 212 and 214 which are of the same nature as the switches 204 and 206. The switches 212 and 214 are conditioned by inputs from a switch 216. The switch 216 has the sign $\Delta X$ and sign $\Delta Y$ signals as inputs as well as the "linear/circular" signal. It acts as a double-pull double-throw switch to reversibly feed the sign $\Delta X$ and sign $\Delta Y$ signals to the switches 212 and 214. When in the linear mode the sign $\Delta X$ signal may be fed to the block 212 and the sign $\Delta Y$ signal may be fed to the block 214; during the circular interpolation this relationship may be reversed. Outputs of the switches 212 and 214 which constitute one of their inputs, depending upon the polarity of their conditioning signals from the switch 216, are fed to the keying square wave generator 50.

The pulse generator 58 also provides a square wave output which has a phase shift intermediate of the two square waves which are provided to the modulators 130 and 132. This 45-degree shifted square wave is fed to a shaper-filter-amplifier 142 in the reference sine wave generator 56 where it is converted to a sine wave. The phase shifter 144 accepts the sine wave and provides two output sine waves, each shifted 45 degrees with respect to its input sine wave, which thus have the same phase shift as the square wave sent to the modulators 130 and 132. These waves are independently amplified by units 146 and 148 and fed to the demodulator units 150 and 152 within the boxes 53 and 54, respectively.

The demodulator unit 150 thus has as its keying input a square wave shifted by the resultant cutting angle, and provides as an output a D.C. voltage proportional to the sine of the resultant cutting angle. This is fed to a filter 154 and then to the potentiometer 60. Similarly, the demodulator 152 provides a D.C. output voltage proportional to the cosine of the resultant cutting angle which its keying square wave provides. This is sent to a filter 156 and then to the potentiometer 62 where it is multiplied by the quantity E.

Having thus described my invention, I claim:

1. In an electronic system for controlling motion which generates two electrical representations of the desired instantaneous motion of the positioned device along two perpendicular axes, uses the representation to generate two analog signals, and controls the device in accordance with such analog signals, the improvement which consists of means for generating two sine waves displaced from one another by 90 degrees having magnitudes proportional to said two representations, an adder for said sine waves operative to produce a third sine wave having a phase displacement proportional to the desired resultant cutting angle, means having said third sine wave as an input and being operative to provide a pair of direct current voltages having magnitudes proportional to the sine and cosine of said resultant cutting angle, and means for multiplying each of said direct current voltages by a correction factor and adding one of the products to each of said two analog signals.

2. In an electronic system for controlling motion from a source of recorded digital information which includes means for generating digital, electrical representations of the desired instantaneous motion of the positioning system along two perpendicular axes and for converting such digital signals into two electrical analog signals for the control of said two axes, the improvement which consists of means for accepting the digital representations of said two components and converting them into static analog voltages, means for generating two sine waves displaced from one another by 90 degrees and having magnitudes proportional to said voltages, means for adding said sine waves so as to generate a sine wave having a phase shift with respect to the input sine waves proportional to the resultant motion angle, means having said last sine wave as an input and being operative to provide a pair of direct current voltages having magnitudes proportional to the sine and cosine of said resultant motion angle, and potentiometers for multiplying said two direct current voltages by a correction factor and adding one of the products to each of the two analog motion control signals.

3. In an electronic system for controlling motion from a source of recorded digital information which includes means for generating digital, electrical representations of the desired instantaneous motion of the positioning system along two perpendicular axes and for converting such digital signals into two electrical analog signals for the control of said two axes, the improvement which consists of means for accepting said digital representations and utilizing them to generate a square wave having a phase displacement relative to a reference which is a function of the desired resultant motion angle, means for generating two sine waves having displacements of zero and 90 degrees with respect to said reference, a pair of phase sensitive demodulators having such square wave as their keying input and the sine waves as their other inputs and being operative to provide a pair of direct current voltages having magnitudes proportional to the sine and the cosine of the desired resultant motion angle, and means for multiplying said two direct current voltages by a correction factor and adding the two products to the two analog motion control signals.

4. In an electronic system for controlling motion from a source of recorded digital information which includes means for generating digital, electrical representations of the desired instantaneous motion of the positioning system along two perpendicular axes and for converting such digital signals into electrical analog signals for the control of said two axes, the improvement which consists of means for accepting the digital representations of said two components and converting them into static analog voltages, means for receiving the two voltages for generating two first sine waves, displaced from one another by 90 degrees and having magnitudes proportional to said voltages, means for adding said sine waves so as to generate a third sine wave having a phase shift with respect to the input sine waves proportional to the resultant motion angle, means for converting said third sine wave into a square wave having the same phase displacement as said third sine wave, means for generating a pair of sine waves displaced from one another by 90 degrees, a pair of demodulators having such square wave as their keying input and the last said pair of sine waves as their other inputs and being operative to provide a pair of direct current voltages having magnitudes proportional to the sine and cosine of said resultant motion angle, and potentiometers for multiplying said two direct current voltages by a correction factor and adding each of the two products to one of the analog motion control signals.

References Cited by the Examiner

UNITED STATES PATENTS

| | | | |
|---|---|---|---|
| 2,980,332 | 4/1961 | Brouilette et al. | 235—197 X |
| 2,983,858 | 5/1961 | Herndon | 318—162 |
| 3,026,040 | 3/1962 | Spencer. | |
| 3,064,168 | 11/1962 | Dosch | 235—151 |

MALCOLM A. MORRISON, *Primary Examiner*.